US012233018B2

(12) United States Patent
Shao

(10) Patent No.: US 12,233,018 B2
(45) Date of Patent: Feb. 25, 2025

(54) ROTARY TELESCOPIC MASSAGER

(71) Applicant: Shenzhen Hijoy Technology Co., Ltd., Shenzhen (CN)

(72) Inventor: Zhubiao Shao, Shenzhen (CN)

(73) Assignee: SHENZHEN HIJOY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/908,843

(22) Filed: Oct. 8, 2024

(65) Prior Publication Data

US 2025/0025371 A1 Jan. 23, 2025

(51) Int. Cl.
*A61H 23/02* (2006.01)
*A61H 19/00* (2006.01)

(52) U.S. Cl.
CPC ......... *A61H 23/0254* (2013.01); *A61H 19/32* (2013.01); *A61H 2201/1215* (2013.01); *A61H 2201/1481* (2013.01)

(58) Field of Classification Search
CPC ................ A61H 23/0254; A61H 19/32; A61H 2201/1215; A61H 2201/1481; A61H 23/006; A61H 2201/12; A61H 2201/123; A61H 2201/149
See application file for complete search history.

(56) References Cited

U.S. PATENT DOCUMENTS

2023/0355466 A1* 11/2023 Cheng ..................... A61F 7/007

* cited by examiner

*Primary Examiner* — Kendra D Carter
*Assistant Examiner* — Arielle Wolff
(74) *Attorney, Agent, or Firm* — Leong C. Lei

(57) ABSTRACT

The invention discloses a rotary telescopic massager, which relates to the technical field of massagers. The rotary telescopic massager comprises a bracket, a telescopic body, a crown gear and a transmission box, wherein a motor is fixedly arranged inside the bracket, the telescopic body is arranged inside the bracket in a sliding way, the crown gear is movably sleeved on the top of the telescopic body, the transmission box is located on one side of the bracket, and a gear I and a gear II which are meshed mutually are rotationally arranged in the transmission box. The gear I and the gear II rotate by the fit of an eccentric boss I and an eccentric boss II, a cylindrical boss and a gear III drive the telescopic body and a massage head carrier for telescopic movement, the gear III drives the telescopic body for telescopic movement through the fit of the crown gear and the gear III while driving the massage head carrier for rotation movement, realizing the simultaneous telescopic movement and rotational movement of the massage head carrier only by a motor drive, reducing the processing cost and the use cost; the structure is simple, compact and cost-efficient, and the application prospect is broad.

10 Claims, 7 Drawing Sheets

ROTARY TELESCOPIC MASSAGER

TECHNICAL FIELD

The invention relates to the technical field of massagers, in particular to a rotary telescopic massager.

BACKGROUND ART

Massager is new generation healthcare equipment developed based on physics, bionics, electrobiology, traditional Chinese medicine and many years of clinical practice, has an independent soft touch massage head, and can relax muscles, soothe nerves, promote blood circulation, strengthen cell metabolism, enhance skin elasticity, alleviate fatigue, significantly relieve a variety of chronic pains, acute pains and muscle pains, relax the body, relieve pressure, and reduce skin wrinkles. The massager is a healthcare appliance, which uses electricity to make the massage head vibrate, simulate acupuncture, massage, massage, hammering, cupping, scraping and other movements and massage the human body. The main function of the massager is to relax the muscles and stimulate blood circulation, eliminate fatigue and prevent disease, and promote metabolism.

The existing massager has only a single rotation or telescopic function, and the massage head with the rotation and telescopic function is required to be driven by multiple motors, the massager has complex structure, high manufacturing cost, use cost and non-ideal use effect. Therefore, a rotary telescopic massager is proposed to solve the above problems.

SUMMARY OF THE INVENTION

The invention provides a rotary telescopic massager to solve problems in background art.

To realize the above purpose, the invention provides the following technical proposal: a rotary telescopic massager comprises:

- a bracket, inside which a motor is fixedly arranged;
- a telescopic body, which is arranged inside the bracket in a sliding way;
- a crown gear, which is movably sleeved on the top of the telescopic body;
- a transmission box, which is located on one side of the bracket, a gear I and a gear II which are meshed mutually are rotationally arranged in the transmission box, an eccentric boss I connected with the output end of the motor is arranged on one side of the gear I, and an eccentric boss II is arranged on one side of the gear II;
- a cylindrical boss, which is fixed on one side of the telescopic body;
- a gear III, which is movably sleeved on the cylindrical boss and meshed with the crown gear, and a transmission seat with one end extending to the eccentric boss II is arranged on one side of the gear III;
- a massage head carrier, which is arranged on the top of the crown gear.

Further, an eccentric hole I sleeved with the output end of the motor in a drive mode is arranged in the eccentric boss I.

Further, a transmission groove sleeved with a transmission seat is arranged in the eccentric boss II, so that the gear II and the gear III rotate synchronously, and an eccentric hole II movably sleeved with one end of the cylindrical boss is arranged in the transmission groove.

Further, the transmission box comprises a box body and a cover plate, wherein the cover plate is embedded on one side of the box body through screws, and two avoidance holes movably sleeved with the eccentric boss I and the eccentric boss II are arranged on one side of the box body.

Further, two fixing holes are arranged inside the cover plate, center shafts are respectively arranged in the gear I and the gear II, and one end of the two center shafts is respectively sleeved in the two fixing holes.

Further, the bracket comprises a front bracket and a rear bracket fixedly connected together by screws, and guide rails are arranged between two ends of the front bracket and the rear bracket.

Further, guide grooves respectively sleeved with two guide rails are arranged on both sides of the telescopic body.

Further, a pressing plate is movably sleeved on the top of the crown gear, and two ends of the pressing plate are fixedly connected with the top of the telescopic body by screws.

Further, a control board located at one end of the motor is installed on one side of the rear bracket through studs and screws.

Further, a clamping seat is arranged on one side of the rear bracket, and a battery is installed inside the clamping seat.

Compared with the prior art, the invention provides a rotary telescopic massager, which has the following beneficial effects:

In the rotary telescopic massager, the gear I and the gear II rotate by the fit of an eccentric boss I and an eccentric boss II, a cylindrical boss and a gear III drive the telescopic body and a massage head carrier for telescopic movement, a gear III drives the telescopic body for telescopic movement through the fit of the crown gear and the gear III while driving the massage head carrier for rotation movement, realizing the simultaneous telescopic movement and rotational movement of the massage head carrier only by a motor drive, reducing the processing cost and the use cost; the structure is simple, compact and cost-efficient, and the application prospect is broad.

Figure 1:
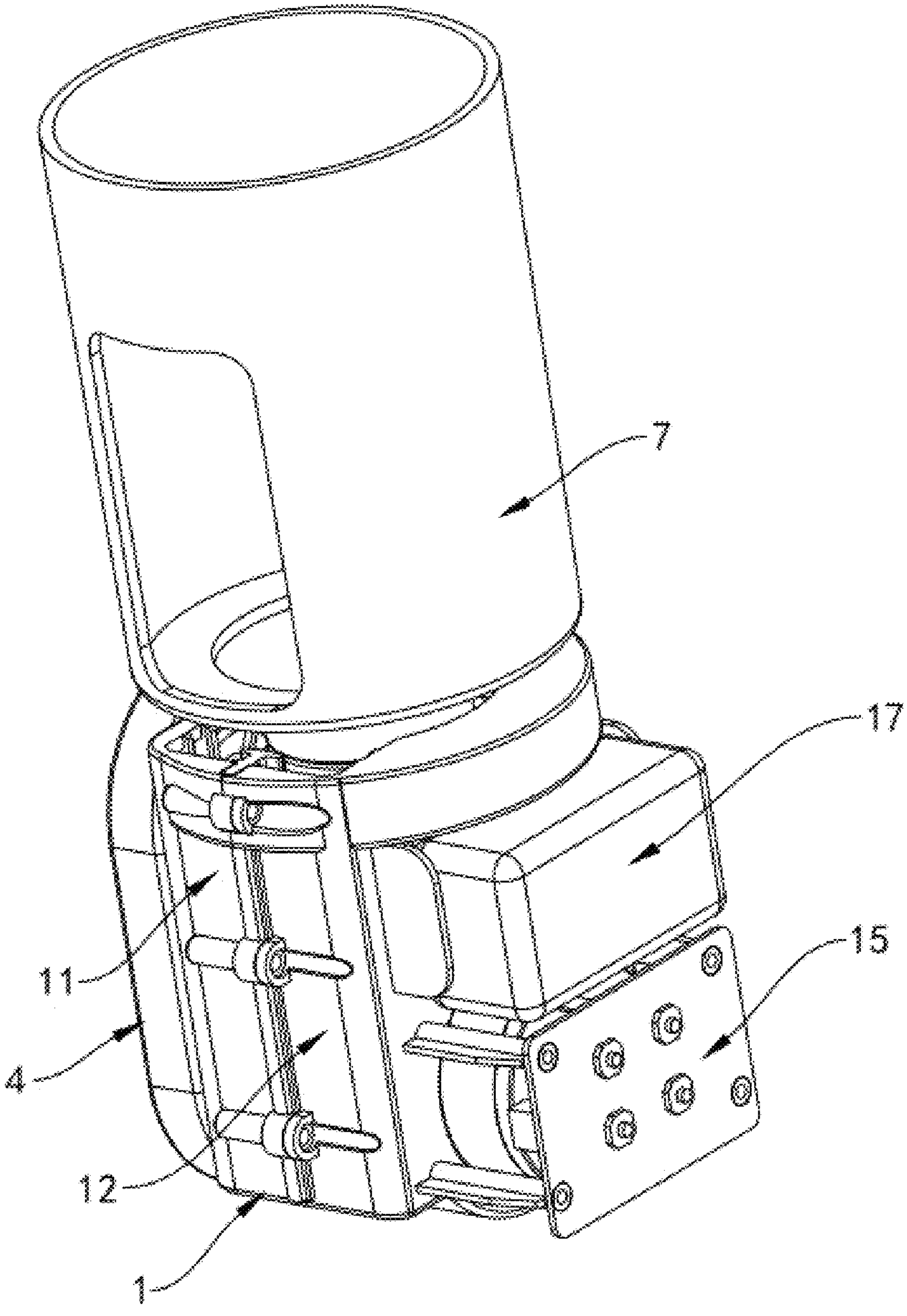
FIG. 1 is the structural diagram for a rotary telescopic massager of the invention.

In the drawings: 1. Bracket; 11. Motor; 12. Front bracket; 13. Rear bracket; 14. Guide rail; 15. Control board; 16. Clamping seat; 17. Battery; 2. Telescopic body; 21. Guide groove; 3. Crown gear; 4. Transmission box; 41. Box body; 411. Avoidance hole; 42. Cover plate; 421. Fixing hole; 43. Gear I; 44. Gear II; 45. Eccentric boss I; 46. Eccentric boss II; 47. Eccentric hole I; 48. Transmission groove; 481. Eccentric hole II 49. Center shaft; 5. Cylindrical boss; 6. Gear III; 61. Transmission seat; 7. Massage head carrier; 8. Pressing plate.

DETAILED DESCRIPTION OF THE INVENTION

In order to have a more detailed understanding of the characteristics and technical content of the embodiments in the disclosure, the embodiments of the disclosure are described in detail in combination with the drawings. The drawings are for reference only and are not intended to limit the embodiments of the disclosure. In the following technical description, for ease of explanation, a number of details are provided for a full understanding of the disclosed embodiments. However, in the absence of these details, one or more embodiments may still be implemented. In other cases, familiar structures and devices may be simplified to simplify the drawings.

The terms "first", "second" and the like in the specification and claims of the disclosure and in the drawings are used to distinguish similar objects and are not necessarily used to describe a particular order or precedence sequence. It should be understood that the data used are interchangeable where appropriate for the purposes of embodiments in the embodiments of the disclosure described herein. Furthermore, the terms "comprise" and "have" and any variants thereof are intended to cover non-exclusive inclusion.

In the embodiments of the disclosure, the orientation or position relationships indicated by the terms "upper", "lower", "inside", "middle", "outside", "front", "rear", etc. are based on the orientation or position relationships shown in the drawings. These terms are primarily intended to better describe the embodiments of the disclosure and their embodiments and are not intended to specify that the indicated device, element or component must have a particular orientation or be constructed and operated in a particular orientation. In addition, some of the above terms may be used to indicate other meanings in addition to orientation or position relationships, such as the term "upper" may also be used to indicate a dependency or connection relationship in some cases. For ordinary technicians in the field, the specific meanings of these terms in the embodiments of the disclosure may be understood on a case-by-case basis.

In addition, the terms "arranged", "connected" and "fixed" should be understood in a broad sense. For example, "connected" can be fixedly connected, detachably connected, or integrally constructed; it can be mechanically connected or electrically connected; it may be directly connected or indirectly connected through an intermediary, or it may be internally connected between two devices, elements or components. For ordinary technicians in the field, the specific meanings of the above terms in the embodiments of the disclosure may be understood on a case-by-case basis.

Unless otherwise stated, the term "a plurality of" means two or more.

It should be noted that the embodiments in the disclosure and the characteristics in the embodiments may be combined with each other without conflict.

Figure 2:
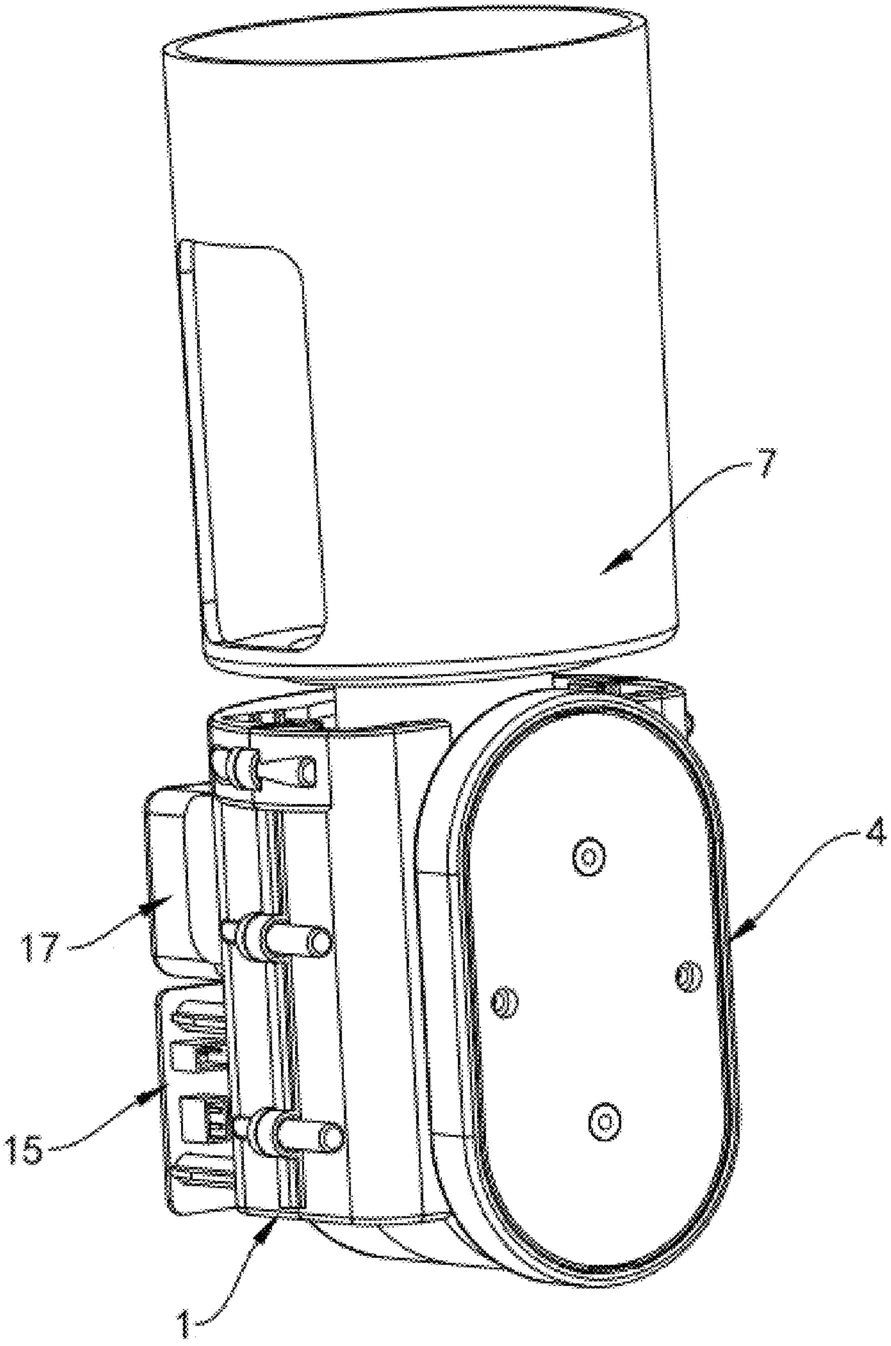
FIG. 2 is a structure side view for a rotary telescopic massager of the invention.
Figure 3:
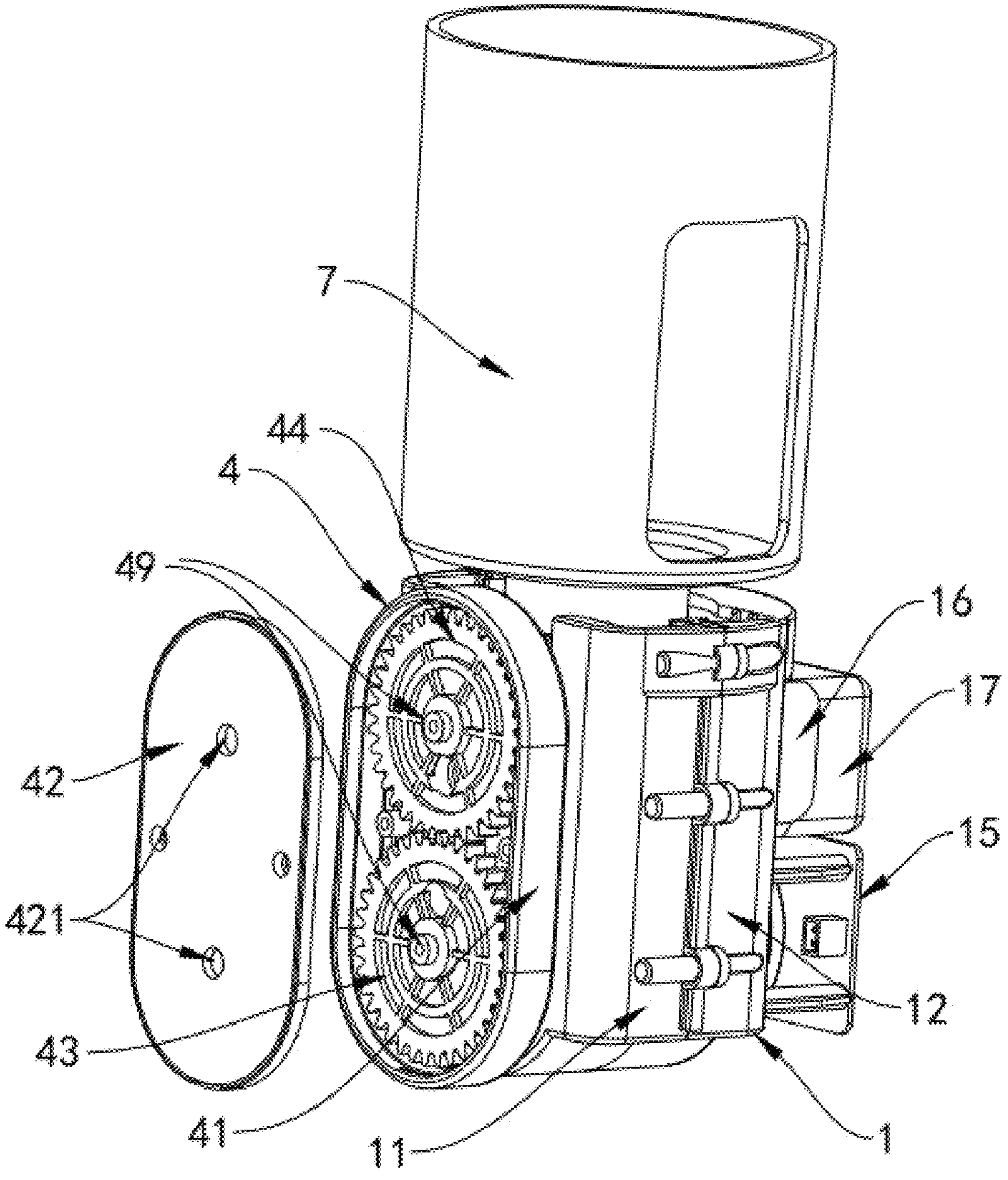
FIG. 3 is the internal structure diagram for a rotary telescopic massager of the invention.
Figure 4:
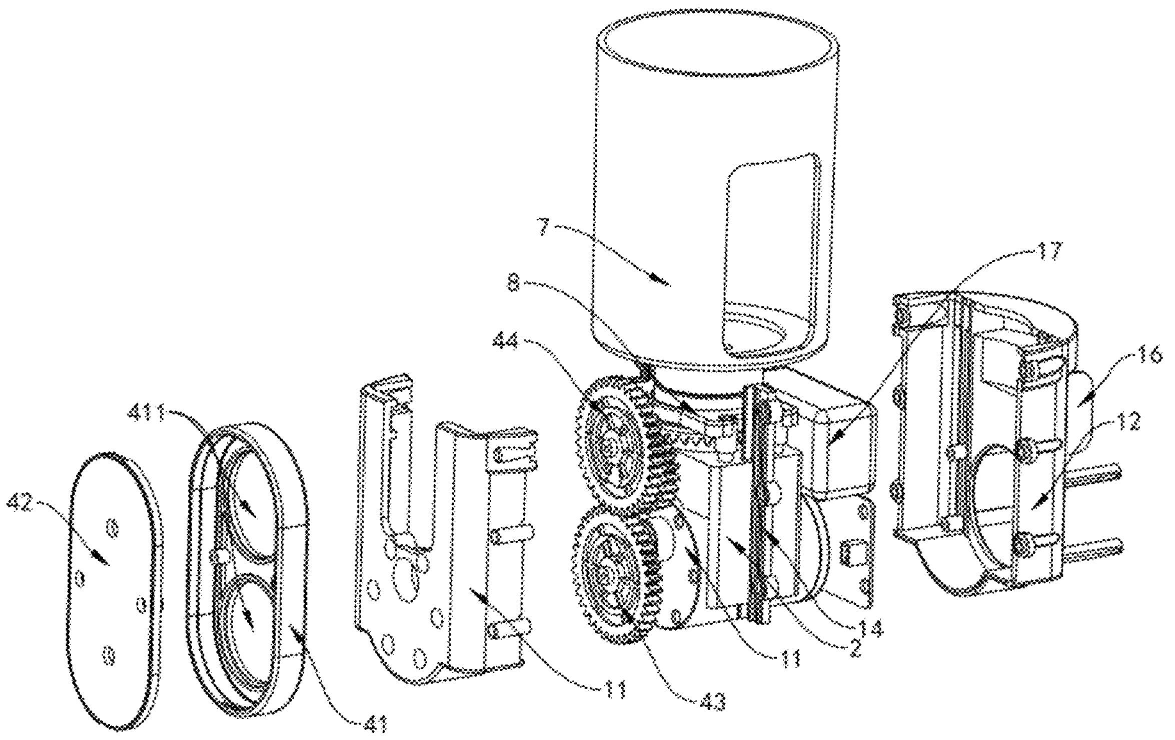
FIG. 4 is a structure explosive view for a rotary telescopic massager of the invention.
Figure 5:
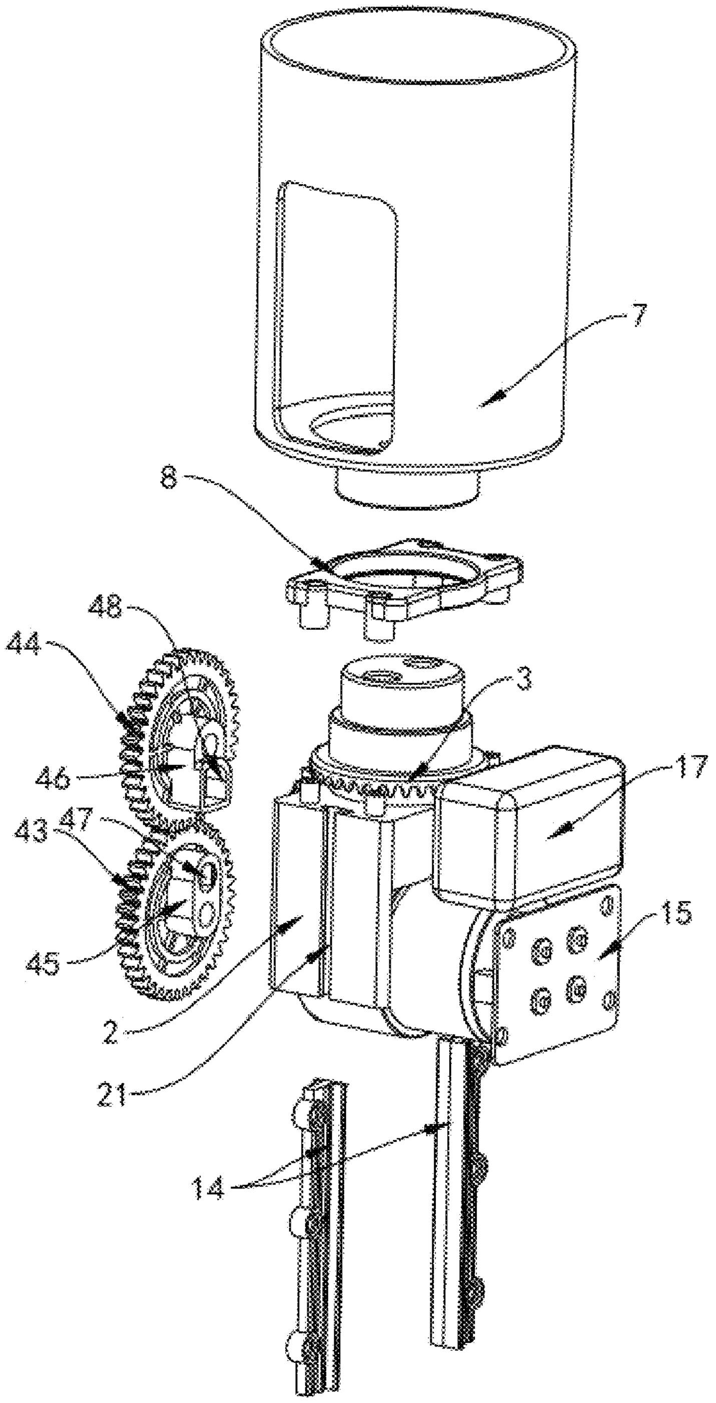
FIG. 5 is the structural diagram for an eccentric boss I and an eccentric boss II of a rotary telescopic massager of the invention.
Figure 6:
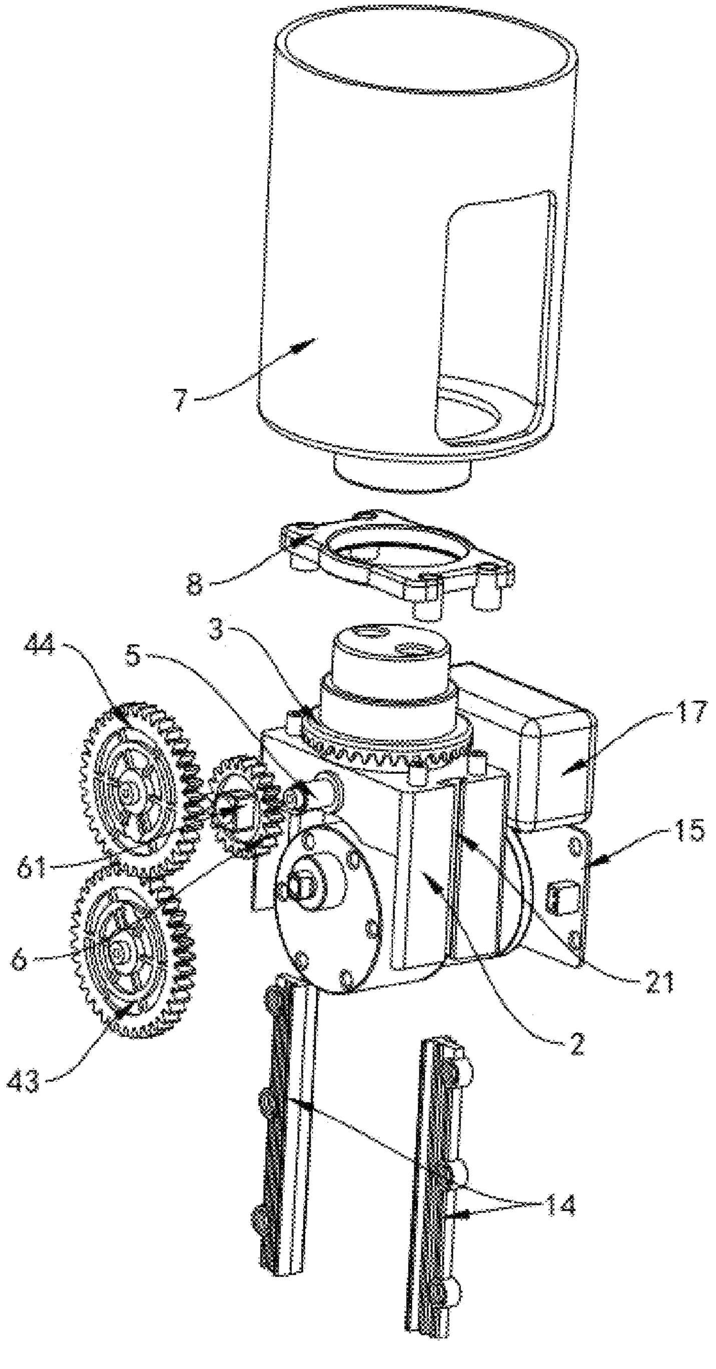
FIG. 6 is the structural diagram for a gear III of a rotary telescopic massager of the invention.
Figure 7:
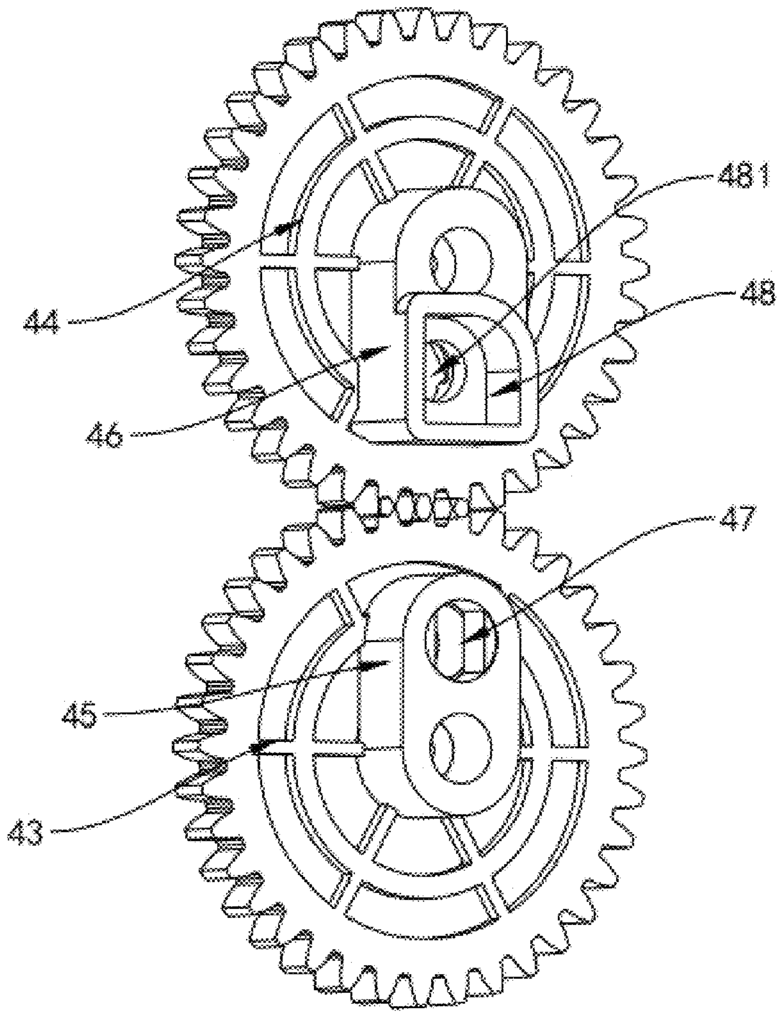
FIG. 7 is the structural diagram for an eccentric hole II of a rotary telescopic massager of the invention.

As shown in FIG. 1 to FIG. 7, the invention discloses a rotary telescopic massager, which comprises a bracket 1, inside which a motor 11 is fixedly arranged;

- a telescopic body 2, which is arranged inside the bracket 1 in a sliding way;
- a crown gear 3, which is movably sleeved on the top of the telescopic body 2;
- a transmission box 4, which is located on one side of the bracket 1, a gear I 43 and a gear II 44 which are meshed mutually are rotationally arranged in the transmission box 4, an eccentric boss I 45 connected with the output end of the motor 11 is arranged on one side of the gear I 43, an eccentric boss II 46 is arranged on one side of the gear II 44, and the number of teeth and diameter of the gear I 43 are the same as that of the gear II 44;
- a cylindrical boss 5, which is fixed on one side of the telescopic body 2;
- a gear III 6, which is movably sleeved on the cylindrical boss 5 and meshed with the crown gear 3, and a transmission seat 61 with one end extending to the eccentric boss II 46 is arranged on one side of the gear III 6;
- a massage head carrier 7, which is arranged on the top of the crown gear 3, the massage head carrier 7 is connected with the top of the crown gear 3 in a drive mode, so that the crown gear 3 drives the massage head carrier 7 to rotate synchronously when rotating, and drives the massage head carrier 7 to extend and retract synchronously when extending and retracting; the massage head carrier 7 is used to install massage heads of different shapes and sizes, and can also be a flexible cylinder massage carrier, which is conducive to increasing the comfort of massage.

The rotary telescopic massager, the gear I 43 and the gear II 44 rotate by the fit of the eccentric boss I 45 and the eccentric boss II 46, the cylindrical boss 5 and the gear III 6 drive the telescopic body 2 and the massage head carrier 7 for telescopic movement, and the gear III 6 drives the telescopic body 2 for telescopic movement through the fit of the crown gear 3 and the gear III 6 while driving the massage head carrier 7 for rotation movement, realizing the simultaneous telescopic movement and rotational movement of the massage head carrier 7 to massage the user; the device has simple transmission structure, high transmission efficiency, low cost, and can meet the production requirements, and can realize massage only by the drive of the motor 11, reducing the processing cost and the use cost; the structure is simple, compact and cost-efficient.

Specifically, an eccentric hole I 47 sleeved with the output end of the motor 11 in a drive mode is arranged in the eccentric boss I 45, a transmission groove 48 sleeved with a transmission seat 61 is arranged in the eccentric boss II 46, so that the gear II 44 and the gear III 6 rotate synchronously, and an eccentric hole II 481 movably sleeved with one end of the cylindrical boss 5 is arranged in the transmission groove 48, the axis distance between the eccentric hole I 47 and the gear I 43 is the same as that between the eccentric hole II 481 and the gear II 44, the eccentric hole II 481 is sleeved with the cylindrical boss 5, and the transmission groove 48 is sleeved with the transmission seat 61; when the gear I 43 drives the gear II 44 to rotate, the distance between the eccentric hole I 47 and the eccentric hole II 481 changes between the farthest and the nearest; in the process, the eccentric boss 46 drives the telescopic body 2 to extend and retract through the cylindrical boss 5 and the gear III 6 to achieve the change of the distance position of the telescopic body 2; at the same time, the gear II 44 drives the gear III 6 to rotate when rotating, and the gear III 6 drives the crown gear 3 to rotate, so that the crown gear 3 drives the massage head carrier 7 to rotate to realize simultaneous telescopic movement and rotational movement of the massage head carrier 7.

Specifically, the transmission box 4 comprises a box body 41 and a cover plate 42, wherein the cover plate 42 is embedded on one side of the box body 41 through screws, and two avoidance holes 411 movably sleeved with the eccentric boss I 45 and the eccentric boss II 46 are arranged on one side of the box body 41 to avoid the rotation of the eccentric boss I 45 and the eccentric boss II 46.

Specifically, two fixing holes 421 are arranged inside the cover plate 42, center shafts 49 are respectively arranged in the gear I 43 and the gear II 44, and one end of the two center shafts 49 is respectively sleeved in the two fixing holes 421; the fit of the fixing holes 421 and the center shafts 49 effectively ensures the rotation stability of the gear 1 43 and the gear II 44, making the synchronous rotation and displacement of the gear 1 43 and the gear II 44 more flexible.

Specifically, the bracket 1 comprises a front bracket 12 and a rear bracket 13 fixedly connected together by screws, and guide rails 14 are arranged between two ends of the front bracket 12 and the rear bracket 13, guide grooves 21 respectively sleeved with two guide rails 14 are arranged on both sides of the telescopic body 2, screws used to fix the front bracket 12 and the rear bracket 13 pass through the guide rails 14, so that the front bracket 12 and the rear bracket 13 are fixed and locked and then naturally clamp the guide rails 14, the joints of the guide groves 21 and the guide rails 14 are T-shaped, and the guide grooves 21 fit with the guide rails 14 to effectively improve the stability of the telescopic body 2 when moving up and down.

Specifically, a pressing plate 8 is movably sleeved on the top of the crown gear 3, and two ends of the pressing plate 8 are fixedly connected with the top of the telescopic body 2 by screws; the pressing plate 8 is arranged to limit the axial relative position of the crown gear 3 and the telescopic body 2, so that the crown gear 3 can only rotate in a circular direction on the top of the telescopic body 2, and the vertical axial movement is synchronized.

Specifically, a control board 15 located at one end of the motor 11 is installed on one side of the rear bracket 13 through studs and screws, a clamping seat 16 is arranged on one side of the rear bracket 13, a battery 17 is installed inside the clamping seat 16, the battery 17 and the motor 11 are electrically connected with the control board 15, and a plurality of buttons for controlling the rotation mode of the motor 11 are arranged on one side of the control board 15.

When in use, the motor 11 is started, the gear I 43 drives the gear II 44 to rotate, the distance between the eccentric hole I 47 and the eccentric hole II 481 vary between the farthest and the nearest; in the process, the eccentric boss II 46 drives the telescopic body 2 to extend and retract through the cylindrical boss 5 and the gear III 6 to achieve the distance position change of the telescopic body 2; at the same time, the gear II 44 drives the gear III 6 to rotate when rotating, and the gear III 6 drives the crown gear 3 to rotate, so that the crown gear 3 drives the massage head carrier 7 to rotate to realize simultaneous telescopic movement and rotational movement of the massage head carrier 7 to massage the user; the device has simple transmission structure, high transmission efficiency, low cost, and can meet the production requirements.

To sum up, in the rotary telescopic massager, the gear I 43 and the gear II 44 rotate by the fit of the eccentric boss I 45 and the eccentric boss II 46, the cylindrical boss 5 and the gear III 6 drive the telescopic body 2 and the massage head carrier 7 for telescopic movement, the gear III 6 drives the telescopic body 2 for telescopic movement through the fit of the crown gear 3 and the gear III 6 while driving the massage head carrier 7 for rotation movement, realizing the simultaneous telescopic movement and rotational movement of the massage head carrier 7 only driven by the motor 11, reducing the processing cost and the use cost; the structure is simple, compact and cost-efficient, and the application prospect is broad.

The embodiments of the disclosure are shown sufficiently in the above descriptions and drawings to enable the technicians in the field to practice them. Other embodiments may include structural changes and other changes. The embodiments represent possible changes only. Individual components and functions are optional unless explicitly required, and the operation sequence can vary. Parts and features of some embodiments may be included in or substitute parts and features of other embodiments. The embodiments of the disclosure are not limited to the structures described above and shown in the drawings, and may be modified and changed within the scope. The scope of the disclosure is limited only by the claims.

The invention claimed is:

1. A rotary telescopic massager, characterized by comprising:

- a bracket (1), inside which a motor (11) is fixedly arranged;
- a telescopic body (2), which is arranged inside the bracket (1) in a sliding way;
- a crown gear (3), which is movably sleeved on the top of the telescopic body (2);
- a transmission box (4), which is located on one side of the bracket (1), a gear I (43) and a gear II (44) which are meshed mutually are rotationally arranged in the transmission box (4), an eccentric boss I (45) connected with the output end of the motor (11) is arranged on one side of the gear I (43), and an eccentric boss II (46) is arranged on one side of the gear II (44);
- a cylindrical boss (5), which is fixed on one side of the telescopic body (2);
- a gear III (6), which is movably sleeved on the cylindrical boss (5) and meshed with the crown gear (3), and a transmission seat (61) with one end extending to the eccentric boss II (46) is arranged on one side of the gear III (6);
- a massage head carrier (7), which is arranged on the top of the crown gear (3).

2. The rotary telescopic massager according to claim 1, characterized in that an eccentric hole I (47) sleeved with the output end of the motor (11) in a drive mode is arranged in the eccentric boss I (45).

3. The rotary telescopic massager according to claim 1, characterized in that a transmission groove (48) sleeved with a transmission seat (61) is arranged in the eccentric boss II (46), so that the gear II (44) and the gear III (6) rotate synchronously, and an eccentric hole two (481) movably sleeved with one end of the cylindrical boss (5) is arranged in the transmission groove (48).

4. The rotary telescopic massager according to claim 3, characterized in that the transmission box (4) comprises a box body (41) and a cover plate (42), wherein the cover plate (42) is embedded on one side of the box body (41) through screws, and two avoidance holes (411) movably sleeved with the eccentric boss I (45) and the eccentric boss II (46) are arranged on one side of the box body (41).

5. The rotary telescopic massager according to claim 4, characterized in that two fixing holes (421) are arranged inside the cover plate (42), center shafts (49) are respectively arranged in the gear I (43) and the gear II (44), and one end of the two center shafts (49) is respectively sleeved in the two fixing holes (421).

6. The rotary telescopic massager according to claim 1, characterized in that the bracket (1) comprises a front bracket (12) and a rear bracket (13) fixedly connected together by screws, and guide rails (14) are arranged between two ends of the front bracket (12) and the rear bracket (13).

7. The rotary telescopic massager according to claim 6, characterized in that a control board (15) located at one end of the motor (11) is installed on one side of the rear bracket (13) through studs and screws.

8. The rotary telescopic massager according to claim 6, characterized in that a clamping seat (16) is arranged on one side of the rear bracket (13), and a battery (17) is installed inside the clamping seat (16).

9. The rotary telescopic massager according to claim 1, characterized in that guide grooves (21) respectively sleeved with two guide rails (14) in a sliding way are arranged on both sides of the telescopic body (2).

10. The rotary telescopic massager according to claim 1, characterized in that a pressing plate (8) is movably sleeved on the top of the crown gear (3), and two ends of the pressing plate (8) are fixedly connected with the top of the telescopic body (2) by screws.

* * * * *